(12) United States Patent
Manifold et al.

(10) Patent No.: US 9,752,281 B2
(45) Date of Patent: Sep. 5, 2017

(54) FIBROUS STRUCTURES AND METHODS FOR MAKING SAME

(75) Inventors: John Allen Manifold, Milan, IN (US); Douglas Jay Barkey, Hamilton Township, OH (US); Angela Marie Leimbach, Hamilton, OH (US); James Allen Cain, Leesburg, GA (US)

(73) Assignee: The Procter & Gamble Company, Cincinnati, OH (US)

( * ) Notice: Subject to any disclaimer, the term of this patent is extended or adjusted under 35 U.S.C. 154(b) by 275 days.

(21) Appl. No.: 12/913,413

(22) Filed: Oct. 27, 2010

(65) Prior Publication Data

US 2012/0107568 A1    May 3, 2012

(51) Int. Cl.
| | | |
|---|---|---|
| *B32B 3/30* | (2006.01) | |
| *D21F 11/00* | (2006.01) | |
| *D21F 11/14* | (2006.01) | |
| *D21H 27/02* | (2006.01) | |

(52) U.S. Cl.
CPC .......... *D21F 11/006* (2013.01); *D21F 11/145* (2013.01); *D21H 27/02* (2013.01); *B32B 3/30* (2013.01); *Y10T 428/24587* (2015.01)

(58) Field of Classification Search
CPC .......... D21F 11/006; D21H 27/02; B32B 3/30
USPC .............. 428/154, 156, 167, 169, 172, 212; 162/109, 113
See application file for complete search history.

(56) References Cited

U.S. PATENT DOCUMENTS

| | | | | |
|---|---|---|---|---|
| 2,912,722 A | * | 11/1959 | Howell ............... | D01H 5/86 19/244 |
| 2,952,260 A | * | 9/1960 | Burgeni ............... | 604/374 |
| 3,737,368 A | * | 6/1973 | Such et al. ........... | 428/169 |
| 3,798,120 A | * | 3/1974 | Enloe et al. .......... | 162/112 |
| 3,953,638 A | * | 4/1976 | Kemp ................... | 428/154 |
| 3,974,025 A | | 8/1976 | Ayers | |
| 4,072,150 A | * | 2/1978 | Glassman ............. | 604/389 |
| 4,158,594 A | * | 6/1979 | Becker ................. | B31F 1/126 156/183 |
| 4,326,002 A | | 4/1982 | Schulz | |
| 4,483,728 A | * | 11/1984 | Bauernfeind ......... | B31F 1/07 156/209 |
| 5,518,801 A | * | 5/1996 | Chappell et al. ..... | 428/152 |
| 5,628,876 A | | 5/1997 | Ayers et al. | |
| 5,804,281 A | | 9/1998 | Phan et al. | |
| 5,885,265 A | | 3/1999 | Osborn et al. | |
| 5,913,765 A | * | 6/1999 | Burgess ................ | B31F 1/07 162/109 |
| 6,017,418 A | | 1/2000 | Oriaran et al. | |
| 6,165,319 A | | 12/2000 | Heath et al. | |

(Continued)

FOREIGN PATENT DOCUMENTS

| | | |
|---|---|---|
| EP | 0 677 612 | 10/1995 |
| EP | 1 876 291 A2 | 1/2005 |

(Continued)

OTHER PUBLICATIONS

U.S. Office Action—U.S. Appl. No. 12/040,637, Jun. 28, 2010 (P&G Case 11014).

(Continued)

*Primary Examiner* — Donald J Loney
(74) *Attorney, Agent, or Firm* — C. Brant Cook

(57) ABSTRACT

Fibrous structures having a surface including a plurality of line elements and a method for making same is provided.

20 Claims, 7 Drawing Sheets

(56) References Cited

U.S. PATENT DOCUMENTS

| | | | |
|---|---|---|---|
| 6,383,958 B1* | 5/2002 | Swanson et al. | 442/151 |
| 6,458,447 B1 | 10/2002 | Cabell et al. | |
| 6,613,954 B1* | 9/2003 | Horney et al. | 604/364 |
| 6,673,202 B2 | 1/2004 | Burazin et al. | |
| 6,706,152 B2 | 3/2004 | Burazin et al. | |
| 6,746,570 B2 | 6/2004 | Burazin et al. | |
| 6,749,719 B2 | 6/2004 | Burazin et al. | |
| 6,787,000 B2 | 9/2004 | Burazin et al. | |
| 6,790,314 B2 | 9/2004 | Burazin et al. | |
| 6,797,114 B2 | 9/2004 | Hu | |
| 6,802,937 B2 | 10/2004 | Johnston et al. | |
| 6,821,385 B2 | 11/2004 | Burazin et al. | |
| 7,419,569 B2 | 9/2008 | Hermans et al. | |
| 7,494,563 B2 | 2/2009 | Edwards et al. | |
| 7,588,660 B2 | 9/2009 | Edwards et al. | |
| 7,687,140 B2 | 3/2010 | Manifold et al. | |
| 7,704,601 B2 | 4/2010 | Manifold et al. | |
| 7,807,022 B2 | 10/2010 | Hermans et al. | |
| 7,811,665 B2 | 10/2010 | Manifold et al. | |
| 7,939,168 B2 | 5/2011 | Manifold et al. | |
| 8,034,463 B2 | 10/2011 | Leimbach et al. | |
| 2003/0022039 A1 | 1/2003 | Lloyd et al. | |
| 2003/0138597 A1 | 7/2003 | Ruthven et al. | |
| 2004/0023003 A1 | 2/2004 | Basler et al. | |
| 2004/0099387 A1 | 5/2004 | Vinson et al. | |
| 2004/0112783 A1 | 6/2004 | Mukai et al. | |
| 2004/0221975 A1 | 11/2004 | Hernandez-Munoa et al. | |
| 2004/0231812 A1 | 11/2004 | Hernandez-Munoa | |
| 2004/0250969 A1 | 12/2004 | Luu et al. | |
| 2004/0256056 A1* | 12/2004 | Hall et al. | 156/345.41 |
| 2004/0256066 A1 | 12/2004 | Lindsay et al. | |
| 2004/0258887 A1 | 12/2004 | Maciag et al. | |
| 2004/0261639 A1 | 12/2004 | Vaughn et al. | |
| 2005/0045293 A1 | 3/2005 | Hermans et al. | |
| 2005/0067126 A1 | 3/2005 | Horenziak et al. | |
| 2005/0178513 A1 | 8/2005 | Russell et al. | |
| 2006/0088697 A1 | 4/2006 | Manifold et al. | |
| 2007/0224419 A1 | 9/2007 | Sumnicht et al. | |
| 2007/0232178 A1 | 10/2007 | Polat et al. | |
| 2007/0298221 A1* | 12/2007 | Vinson | B32B 3/30 428/154 |
| 2008/0008865 A1 | 1/2008 | Luu et al. | |
| 2008/0029235 A1 | 2/2008 | Edwards et al. | |
| 2008/0041543 A1 | 2/2008 | Dyer et al. | |
| 2008/0087395 A1 | 4/2008 | Prodoehl et al. | |
| 2008/0260996 A1 | 10/2008 | Heilman et al. | |
| 2009/0218057 A1 | 9/2009 | Manifold et al. | |
| 2009/0220731 A1 | 9/2009 | Manifold et al. | |
| 2009/0220741 A1 | 9/2009 | Manifold et al. | |
| 2009/0220769 A1 | 9/2009 | Manifold et al. | |
| 2010/0136294 A1 | 6/2010 | Manifold et al. | |
| 2010/0139876 A1 | 6/2010 | Manifold et al. | |
| 2010/0203293 A1 | 8/2010 | Manifold et al. | |

FOREIGN PATENT DOCUMENTS

| | | |
|---|---|---|
| EP | 1 505 207 A2 | 2/2005 |
| GB | 2319539 A | 5/1998 |
| WO | WO 96/33310 A1 | 10/1996 |
| WO | WO 97/17494 A1 | 5/1997 |
| WO | WO 98/44194 A1 | 10/1998 |
| WO | WO 00/39394 | 6/2000 |
| WO | WO 2005/021868 A1 | 3/2005 |
| WO | WO 2005/068720 A1 | 7/2005 |
| WO | WO 2005/080683 A2 | 9/2005 |
| WO | WO 2006/060814 A2 | 6/2006 |
| WO | WO 2007/001576 A1 | 1/2007 |
| WO | WO 2007/070124 A1 | 6/2007 |

OTHER PUBLICATIONS

U.S. Office Action U.S. Appl. No. 12/040,637, Oct. 14, 2010 (P&G Case 11014).
U.S. Office Action—U.S. Appl. No. 12/040,662, Apr. 15, 2010 (P&G Case 11015).
U.S. Office Action—U.S. Appl. No. 12/040,662, Oct. 1, 2010 (P&G Case 11015).
U.S. Office Action—U.S. Appl. No. 12/040,701, Sep. 9, 2009 (P&G Case 11017).
U.S. Office Action—U.S. Appl. No. 12/040,701, Dec. 18, 2009 (P&G Case 11017).
U.S. Office Action—U.S. Appl. No. 12/040,701, Jan. 8, 2010 (P&G Case 11017).
U.S. Office Action—U.S. Appl. No. 12/040,701, Jun. 28, 2010 (P&G Case 11017).
U.S. Office Action U.S. Appl. No. 12/040,701, Oct. 14, 2010 (P&G Case 11017).
U.S. Office Action—U.S. Appl. No. 12/040,715, Sep. 16, 2009 (P&G Case 11018).
U.S. Office Action—U.S. Appl. No. 12/040,715, Mar. 29, 2010 (P&G Case 11018).
U.S. Office Action U.S. Appl. No. 12/040,715, Jan. 5, 2011 (P&G Case 11018).
U.S. Office Action—U.S. Appl. No. 12/710,655, Jul. 21, 2010 (P&G Case 11019D).
U.S. Office Action U.S. Appl. No. 12/710,655, Dec. 17, 2010 (P&G Case 11019D).
U.S. Office Action U.S. Appl. No. 12/040,671, Oct. 26, 2010 (P&G Case 11020C).
El-Hosseiny, et al., "Effect of Fiber Length and Coarseness of the Burst Strength of Paper", TAPPI Journal, vol. 82: No. 1 (Jan. 1999), pp. 202-203.
Smook, Gary A., Second Edition Handbook for Pulp & Paper Technologists, 1992, Angus Wilde Publications, Chapter 13, pp. 194-208.
All Office Action in U.S. Appl. Nos. 13/216,298, 13/420,983, 12/040,662, 12/814,851, 12/851,945, 13/098,746, 12/040,715, 13/169,099, 13/078,275, 12/700,238, 12/700,250, 12/700,261, 12/700,283, 12/700,295, 12/913,413 (P&G Cases 11014C, 11014CC, 11015, 11015C, 11016C, 11017C, 11018, 11019DC, 11020CC, 11600, 11601, 11602, 11603, 11604, and 11919, respectively).
U.S. Office Action—U.S. Appl. No. 12/040,662, Apr. 13, 2011 (P&G Case 11015).
U.S. Office Action—U.S. Appl. No. 12/814,851, Apr. 14, 2011 (P&G Case 11015C).
U.S. Office Action—U.S. Appl. No. 13/216,298, Nov. 14, 2011 (P&G Case 11014C).
U.S. Office Action—U.S. Appl. No. 12/040,662, Oct. 4, 2011 (P&G Case 11015).
U.S. Office Action—U.S. Appl. No. 12/814,851, Oct. 4, 2011 (P&G Case 11015C).
U.S. Office Action—U.S. Appl. No. 12/851,945, Aug. 2, 2011 (P&G Case 11016C).
U.S. Office Action—U.S. Appl. No. 12/851,945, Nov. 21, 2011 (P&G Case 11016C).
U.S. Office Action—U.S. Appl. No. 13/098,746, Nov. 1, 2011 (P&G Case 11017C).
U.S. Office Action U.S. Appl. No. 12/040,715, Aug. 31, 2011 (P&G Case 11018).
U.S. Office Action U.S. Appl. No. 13/169,099, Nov. 14, 2011 (P&G Case 11019DC).
U.S. Office Action U.S. Appl. No. 13/078,275, Oct. 11, 2011 (P&G Case 11020CC).
All Office Action in U.S. Appl. Nos. 13/420,983 (P&G Case 11014CC), 12/040,662 (P&G Case (11015), 12/814,851 (P&G Case 11015C), 13/899,706 (P&G Case 11016CC), 13/098,746 (P&G Case 11017C), 13/938,519 (P&G Case 11017CC), 12/040,715 (P&G Case 11018), 13/463,152 (P&G Case 11019DCC), 13/078,275 (P&G Case 11020CC), 13/927,499 (P&G Case 11020CCC), 13/677,816 (P&G Case 11601C), 13/677,925 (P&G Case 11602C), 12/913,413 (P&G Case 11919).
All Office Action in U.S. Appl. Nos. 13/420,983 (P&G Case 11014CC), 12/040,662 (P&G Case (11015), 12/814,851 (P&G Case 11015C), 13/899,706 (P&G Case 11016CC), 13/938,519 (P&G Case 11017CC), 12/040,715 (P&G Case 11018), 13/463,152 (P&G

(56) References Cited

OTHER PUBLICATIONS

Case 11019DCC), 13/927,499 (P&G Case 11020CCC), 13/677,816 (P&G Case 11601C), 14/016,355 (P&G Case 11602CC), 12/913,413 (P&G Case 11919).
U.S. Appl. No. 14/066,743, filed Oct. 30, 2013, Manifold, et al.
U.S. Appl. No. 14/016,355, filed Sep. 3, 2013, Manifold, et al.
All Office Action in U.S. Appl. Nos. 13/420,983 (P&G Case 11014CC), 12/040,662 (P&G Case (11015), 12/814,851 (P&G Case 11015C), 13/899,706 (P&G Case 11016CC), 13/098,746 (P&G Case 11017C), 13/938,519 (P&G Case 11017CC), 12/040,715 (P&G Case 11018), 13/463,152 (P&G Case 11019DCC), 13/078,275 (P&G Case 11020CC), 13/927,499 (P&G Case 11020CCC), 13/677,816 (P&G Case 11601C), 13/677,925 (P&G Case 11602C), 14/016,355 (P&G Case 11602CC), 12/913,413 (P&G Case 11919).

* cited by examiner

FIBROUS STRUCTURES AND METHODS FOR MAKING SAME

FIELD OF THE INVENTION

The present invention relates to fibrous structures and more particularly to fibrous structures comprising a surface comprising a plurality of line elements and a method for making same.

BACKGROUND OF THE INVENTION

In the past, many attempts have been made to enhance and increase certain physical properties of such products. Unfortunately, however, when steps are taken to increase one property of these products, other characteristics of the products may be adversely affected.

For instance, the strength of nonwoven products, such as various sanitary tissue products, can be increased by several different methods, such as by selecting a particular fiber type, or by increasing cellulosic fiber bonding within the product. Increasing strength, according to one of the above methods, however, may adversely affect the flexibility of the product. Conversely, steps normally taken to increase the strength of a fibrous structure typically have an adverse impact upon the softness, the flexibility or the absorbency of the web.

Fibrous structures comprising linear elements, which increased the flexibility of the fibrous structure and methods for making same are known in the art. However, such fibrous structures are taught as having alternating continuous knuckles and continuous pillows that run in substantially the machine direction of the fibrous structures as shown in FIG. 1. Such prior art structures are typically made on a molding member that comprises a support member, which it typically foraminous, for example a through-air-drying fabric, and then a polymeric resin associated with the support member such that alternating linear elements and polymeric resin void areas in the form of knuckles and channels, as shown in FIG. 2. Such known fibrous structures have exhibited increased flexibility, but as a result have exhibited decreased tensile strength.

Accordingly, there is a need for fibrous structures that decouple their flexibility and strength properties such that increasing flexibility does not impact the strength of the fibrous structures to levels that are unacceptable to consumers and/or does not negatively impact the strength of the fibrous structures.

SUMMARY OF THE INVENTION

The present invention fulfills the need described above by providing a fibrous structure that comprises a plurality of first line elements and a plurality of second line elements, wherein the fibrous structure exhibits increased flexibility and consumer acceptable strength and a method for making such a fibrous structure.

In one example of the present invention, a fibrous structure comprising a surface comprising at least two first line elements extending in a first direction and at least two second line elements extending in a second direction different from the first direction, wherein the ratio of the average distance between the two second line elements and the average distance between the two first line elements is greater than 1, is provided.

In another example of the present invention, a single- or multi-ply sanitary tissue product comprising a fibrous structure according to the present invention, is provided.

In still another example of the present invention, a method for making a fibrous structure comprising the steps of:
a. depositing a fibrous slurry onto a forming wire to form an embryonic web;
b. transferring the embryonic web to a molding member such that a surface comprising at least two first line elements extending in a first direction and at least two second line elements extending in a second direction different from the first direction, wherein the ratio of the average distance between the two second line elements and the average distance between the two first line elements is greater than 1 is formed in the embryonic web; and
c. drying the embryonic web such that a fibrous structure comprising a surface comprising at least two first line elements extending in a first direction and at least two second line elements extending in a second direction different from the first direction, wherein the ratio of the average distance between the two second line elements and the average distance between the two first line elements is greater than 1 is formed.

In even yet another example of the present invention, a patterned drying belt (molding member or papermaking belt) suitable for making a fibrous structure of the present invention is provided.

The present invention provides a fibrous structure that exhibits consumer acceptable flexibility and strength and a method for making such fibrous structure.

DETAILED DESCRIPTION OF THE INVENTION

Definitions

Figure 1:
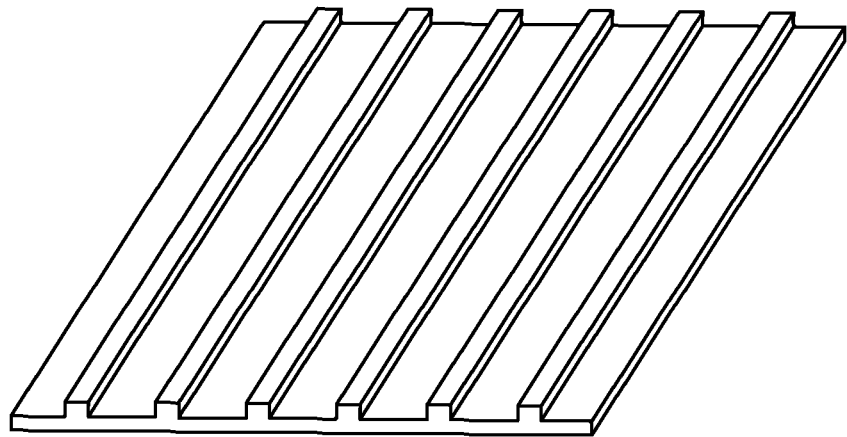
FIG. 1 is a schematic representation of a prior art fibrous structure.

"Fibrous structure" as used herein means a structure that comprises one or more filaments and/or fibers. In one example, a fibrous structure according to the present invention means an orderly arrangement of filaments and/or fibers within a structure in order to perform a function. Nonlimiting examples of fibrous structures of the present invention include paper, fabrics (including woven, knitted, and nonwoven), and absorbent pads (for example for diapers or feminine hygiene products).

Nonlimiting examples of processes for making fibrous structures include known wet-laid papermaking processes, including through-air-dried (TAD), conventional wet-pressing, wet micro-contraction, fabric creping, and belt creping, and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

In addition to wet-laid and air-laid processes, the fibrous structures for the present invention may be made by meltblowing and/or spunbonding processes also.

The fibrous structures of the present invention may be homogeneous or may be layered. If layered, the fibrous structures may comprise at least two and/or at least three and/or at least four and/or at least five layers.

"Fiber" and/or "Filament" as used herein means an elongate particulate having an apparent length greatly exceeding its apparent width, i.e. a length to diameter ratio of at least about 10. In one example, a "fiber" is an elongate particulate as described above that exhibits a length of less than 5.08 cm (2 in.) and a "filament" is an elongate particulate as described above that exhibits a length of greater than or equal to 5.08 cm (2 in.).

Fibers are typically considered discontinuous in nature. Nonlimiting examples of fibers include wood pulp fibers and synthetic staple fibers such as polyester fibers.

Filaments are typically considered continuous or substantially continuous in nature. Filaments are relatively longer than fibers. Nonlimiting examples of filaments include meltblown and/or spunbond filaments. Nonlimiting examples of materials that can be spun into filaments include natural polymers, such as starch, starch derivatives, cellulose and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. Nos. 4,300,981 and 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

In addition to the various wood pulp fibers, other cellulosic fibers such as cotton linters, rayon, lyocell and bagasse can be used in this invention. Other sources of cellulose in the form of fibers or capable of being spun into fibers include grasses and grain sources.

"Sanitary tissue product" as used herein means a soft, low density (i.e. <about 0.15 $g/cm^3$) web useful as a wiping implement for post-urinary and post-bowel movement cleaning (toilet tissue), for otorhinolaryngological discharges (facial tissue), multi-functional absorbent and cleaning uses (absorbent towels), and wipes, including wet wipes. The sanitary tissue product may be convolutely wound upon itself about a core or without a core to form a sanitary tissue product roll.

In one example, the sanitary tissue product of the present invention comprises a fibrous structure according to the present invention.

The sanitary tissue products and/or fibrous structures of the present invention may exhibit a basis weight of greater than 15 $g/m^2$ to about 120 $g/m^2$ and/or from about 15 $g/m^2$ to about 110 $g/m^2$ and/or from about 20 $g/m^2$ to about 100 $g/m^2$ and/or from about 30 $g/m^2$ to 90 $g/m^2$. In addition, the sanitary tissue products and/or fibrous structures of the present invention may exhibit a basis weight between about 40 $g/m^2$ to about 120 $g/m^2$ and/or from about 50 $g/m^2$ to about 110 $g/m^2$ and/or from about 55 $g/m^2$ to about 105 $g/m^2$ and/or from about 60 $g/m^2$ to 100 $g/m^2$.

The sanitary tissue products of the present invention may exhibit a total dry tensile strength of greater than about 150 g/in and/or from about 200 g/in to about 1000 g/in and/or from about 250 g/in to about 850 gin. In addition, the sanitary tissue product of the present invention may exhibit a total dry tensile strength of greater than about 500 g/in and/or from about 500 g/in to about 1000 g/in and/or from about 550 g/in to about 850 g/in and/or from about 600 g/in to about 800 g/in. In one example, the sanitary tissue product exhibits a total dry tensile strength of less than about 1000 g/in and/or less than about 850 g/in.

In another example, the sanitary tissue products of the present invention may exhibit a total dry tensile strength of greater than about 500 g/in and/or greater than about 600 g/in and/or greater than about 700 g/in and/or greater than about 800 g/in and/or greater than about 900 g/in and/or greater than about 1000 g/in and/or from about 800 g/in to about 5000 g/in and/or from about 900 g/in to about 3000 g/in and/or from about 900 g/in to about 2500 g/in and/or from about 1000 g/in to about 2000 g/in.

The sanitary tissue products of the present invention may exhibit an initial total wet tensile strength of less than about 200 g/in and/or less than about 150 g/in and/or less than about 100 g/in and/or less than about 75 g/in.

The sanitary tissue products of the present invention may exhibit an initial total wet tensile strength of greater than about 300 g/in and/or greater than about 400 g/in and/or greater than about 500 g/in and/or greater than about 600 g/in and/or greater than about 700 g/in and/or greater than about 800 g/in and/or greater than about 900 g/in and/or greater than about 1000 g/in and/or from about 300 g/in to about 5000 g/in and/or from about 400 g/in to about 3000 g/in and/or from about 500 g/in to about 2500 g/in and/or from about 500 g/in to about 2000 g/in and/or from about 500 g/in to about 1500 g/in.

The sanitary tissue products of the present invention may exhibit a density (measured at 95 g/in$^2$) of less than about 0.60 g/cm$^3$ and/or less than about 0.30 g/cm$^3$ and/or less than about 0.20 g/cm$^3$ and/or less than about 0.10 g/cm$^3$ and/or less than about 0.07 g/cm$^3$ and/or less than about 0.05 g/cm$^3$ and/or from about 0.01 g/cm$^3$ to about 0.20 g/cm$^3$ and/or from about 0.02 g/cm$^3$ to about 0.10 g/cm$^3$.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

The sanitary tissue products of the present invention may comprises additives such as softening agents, temporary wet strength agents, permanent wet strength agents, bulk softening agents, lotions, silicones, wetting agents, latexes, especially surface-pattern-applied latexes, dry strength agents such as carboxymethylcellulose and starch, and other types of additives suitable for inclusion in and/or on sanitary tissue products.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Basis Weight" as used herein is the weight per unit area of a sample reported in lbs/3000 ft$^2$ or g/m$^2$ and is measured according to the Basis Weight Test Method described herein.

"Caliper" as used herein means the macroscopic thickness of a fibrous structure. Caliper is measured according to the Caliper Test Method described herein.

"Bulk" as used herein is calculated as the quotient of the Caliper (hereinafter defined), expressed in microns, divided by the basis weight, expressed in grams per square meter. The resulting Bulk is expressed as cubic centimeters per gram. For the products of this invention, Bulks can be greater than about 3 cm$^3$/g and/or greater than about 6 cm$^3$/g and/or greater than about 9 cm$^3$/g and/or greater than about 10.5 cm$^3$/g up to about 30 cm$^3$/g and/or up to about 20 cm$^3$/g. The products of this invention derive the Bulks referred to above from the basesheet, which is the sheet produced by the tissue machine without post treatments such as embossing. Nevertheless, the basesheets of this invention can be embossed to produce even greater bulk or aesthetics, if desired, or they can remain unembossed. In addition, the basesheets of this invention can be calendered to improve smoothness or decrease the Bulk if desired or necessary to meet existing product specifications.

"Basis Weight Ratio" as used herein is the ratio of low basis weight portion of a fibrous structure to a high basis weight portion of a fibrous structure. In one example, the fibrous structures of the present invention exhibit a basis weight ratio of from about 0.02 to about 1. In another example, the basis weight ratio of the basis weight of a linear element of a fibrous structure to another portion of a fibrous structure of the present invention is from about 0.02 to about 1.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

"Line element" as used herein means a discrete, portion of a fibrous structure being in the shape of a line, which may be of any suitable shape such as straight, bent, kinked, curled, curivilinear, serpentine, sinusoidal and mixtures thereof, wherein the line has a length of greater than about 1 mm and/or greater than 2 mm and/or greater than 3 mm and/or greater than 4.5 mm. In one example, a first line element is interrupted by a second line element different from the first line element. In another example, a first line element is interrupted by a second line element the identical or substantially identical to the first line element.

Different line elements may exhibits different common intensive properties. For example, different line elements may exhibit different densities and/or basis weights. In one example, a fibrous structure of the present invention comprises a first group of first line elements and a second group of second line elements. The first group of first line elements may exhibit the same densities, which are lower than the densities of second line elements in a second group.

In one example, the line element is a straight or substantially straight line element. The line element is a curvilinear line element. Unless otherwise stated, the line elements of the present invention are present on a surface of a fibrous structure. The length and/or width and/or height of the line element and/or line element forming component within a molding member, which results in a line element within a fibrous structure, is measured by the Dimensions of Linear Element/Linear Element Forming Component Test Method described herein.

In one example, the line element and/or line element forming component is continuous or substantially continuous within a useable fibrous structure, for example in one case one or more 11 cm×11 cm sheets of fibrous structure.

The line elements may exhibit different widths along their lengths, between two or more different line elements and/or the line elements may exhibit different lengths. Different line elements my exhibit different widths and/or lengths.

"Average distance" as used herein with reference to the average distance between two line elements is the average of the distances measured between the centers of two immediately adjacent line elements measured along their respective lengths. Obviously, if one of the line elements extends further than the other, the measurements would stop at the ends of the shorter line element.

In one example, a plurality of line elements are present on the surface, such as a plurality of first line elements, then the average distance for the purpose of the ratio of average distances is the maximum average distance measured between immediately adjacent line elements within the plurality of line elements.

"Discrete" as it refers to a line element means that a line element has at least one immediate adjacent region of the fibrous structure that is different from the linear element.

"Unidirectional" as it refers to a linear element means that along the length of the linear element, the linear element does not exhibit a directional vector that contradicts the linear element's major directional vector.

"Uninterrupted" as it refers to a line element means that a line element does not have a region that is different from the line element cutting across the line element along its length. Undulations within a linear element such as those resulting from operations such as creping and/or foreshortening are not considered to result in regions that are different from the line element and thus do not interrupt the line element along its length.

"Water-resistant" as it refers to a line element means that a line element retains its structure and/or integrity after being saturated with water.

"Substantially machine direction oriented" as it refers to a line element means that the total length of the line element that is positioned at an angle of greater than 45° to the cross machine direction is greater than the total length of the line element that is positioned at an angle of 45° or less to the cross machine direction.

"Substantially cross machine direction oriented" as it refers to a line element means that the total length of the line element that is positioned at an angle of 45° or greater to the machine direction is greater than the total length of the line element that is positioned at an angle of less than 45° to the machine direction.

Fibrous Structure

Figure 3A:
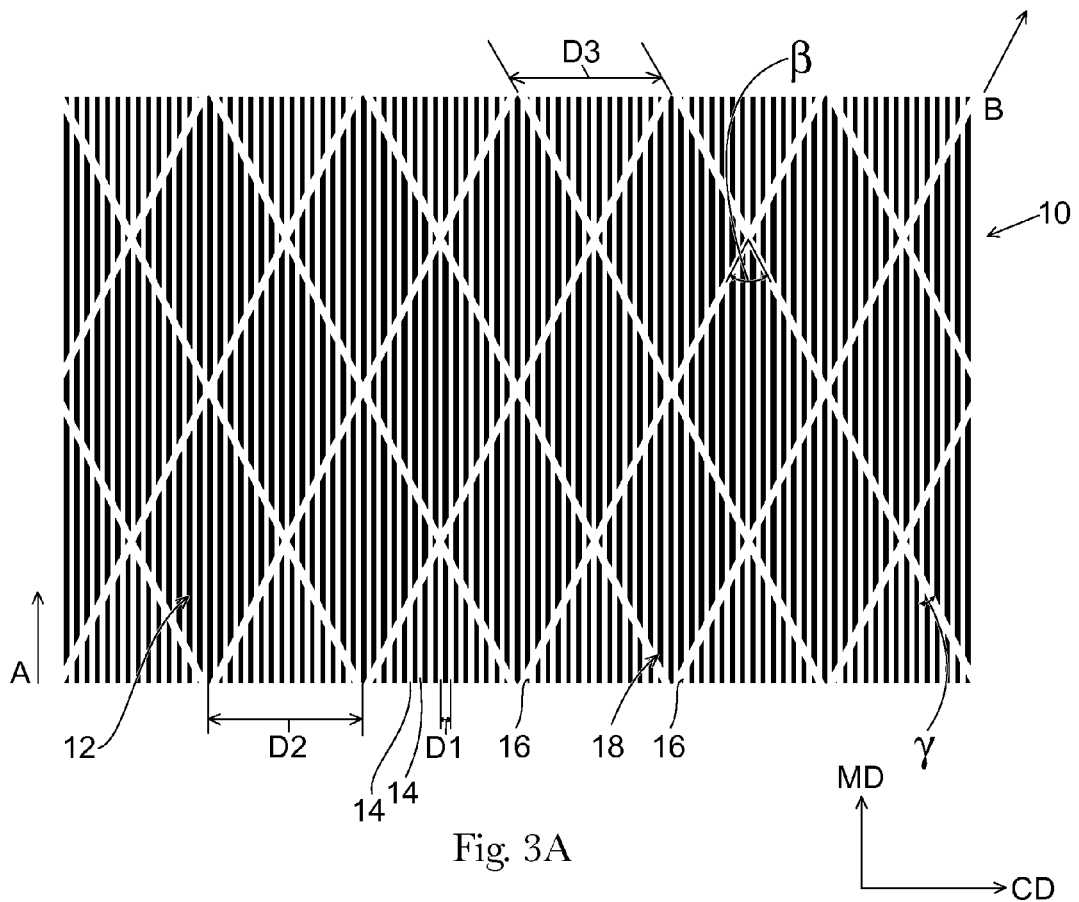
FIG. 3A is a schematic representation of an example of fibrous structure according to the present invention.
Figure 3B:
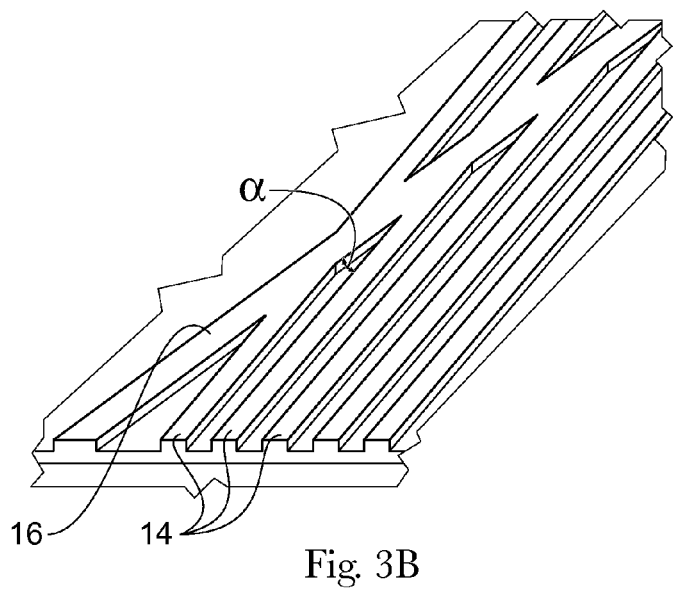
FIG. 3B is a exploded view of a portion of FIG. 3A.

As shown in FIGS. 3A and 3B, a fibrous structure 10 of the present invention comprises a surface 12 comprising at least two first line elements 14 extending in a first direction A and at least two second line elements 16 extending in a second direction B wherein the ratio of the average distance $D_2$ between the two second line elements 16 and the average distance $D_1$ between the two first line elements 14 is greater than 1 and/or greater than 1.2 and/or greater than 1.5 and/or greater than 2 and/or greater than 2.5.

The first line elements 14 may extend in a first direction and the second line elements 16 may extend in a second direction different from the first direction.

In one example, the average distance $D_1$ is greater than 0.25 mm and/or greater than 0.5 mm and/or greater than 0.75 mm and/or greater than 1 mm and/or greater than 1.5 mm and/or greater than 2 mm and/or less than 30 mm and/or less than 20 mm and/or less than 10 mm and/or less than 5 mm.

In another example, the average distance $D_2$ is greater than 5 mm and/or greater than 10 mm and/or greater than 15 mm and/or greater than 20 mm and/or less than 100 mm and/or less than 75 mm and/or less than 50 mm and/or less than 40 mm.

In one example, the surface 12 of the fibrous structure 10 may comprise a plurality of first line elements 14 and/or a plurality of second line elements 16.

The first line elements 14 may be parallel or substantially parallel to one another. Likewise, the second line elements 16 may be parallel or substantially parallel to one another.

In one example, the surface 12 of the fibrous structure 10 comprises both a plurality of first line elements 14, for example extending in a first direction, and a plurality of second line elements 16, for example extending in a second direction different from the first direction. In one example, the ratio of the maximum average distance between adjacent second line elements and the maximum average distance between adjacent first line elements is greater than 1 and/or greater than 1.2 and/or greater than 1.5 and/or greater than 2 and/or greater than 2.5.

In another example, at least one of the first line elements 14 is connected to at least one of the second line elements 16. One or more of the first line elements 14 may be in the same plane ("coplanar") as one or more of the second line elements 16. In one example, all of the first line elements 14 present on the surface 12 of the fibrous structure 10 are in the same plane ("coplanar") as all of the second line elements 16.

When connected, the second line element 16 may be connected to at least one of the first line elements 14 at an angle α of from about 5° to about 90° and/or from about 10° to about 85° and/or from about 10° to about 70° and/or from about 10° to about 40°.

In yet another example, each first line element 14 is connected to at least one second line element 16.

In one example, at least one of the first line elements 14 comprises a curvilinear line element.

In another example, at least one of the second line elements 16 comprises a curvilinear line element.

In still another example, the fibrous structure 10 of the present invention may comprise a surface 12 that further comprises a third line element 18. The third line element 18 may extend in a third direction different from the first and/or second directions. The surface 12 may comprise two or more third line elements 18. The average distance $D_3$ between two immediately adjacent third line elements 18 may be the same or different as the average distance $D_2$ between immediately second line elements 16.

One or more third line elements 18 may intersect at least one second line element 16. The intersection of a third line element 18 and a second line element 16 may occur at an angle β of from about 10' to about 90° and/or from about 45° to about 90°. In another example, the second line element 16 intersects the third line element 18 at an angle of from about 10° to about 45°.

One or more third line elements 18 may connect to at least one first line elements 14.

One or more of the first line elements 14 may be in the same plane ("coplanar") as one or more of the third line elements 18. In one example, all of the first line elements 14 present on the surface 12 of the fibrous structure 10 are in the same plane ("coplanar") as all of the third line elements 18.

When connected, the third line element 18 may be connected to at least one of the first line elements 14 at an angle γ of from about 5° to about 90° and/or from about 10° to about 85° and/or from about 10° to about 70° and/or from about 10° to about 40°.

In yet another example, each first line element 14 is connected to at least one third line element 18.

Figure 4A:
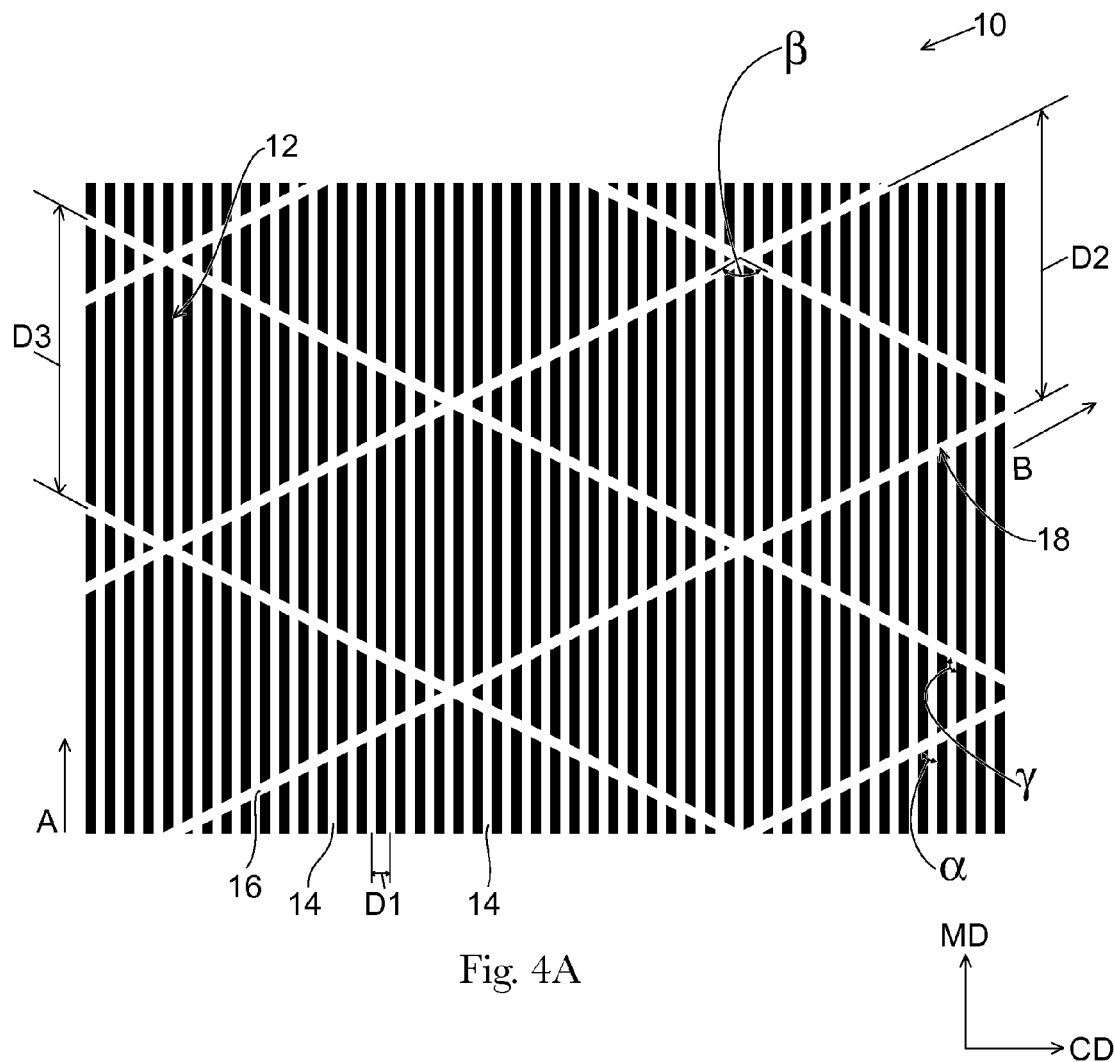
FIG. 4A is a schematic representation of another example of fibrous structure according to the present invention.
Figure 4B:
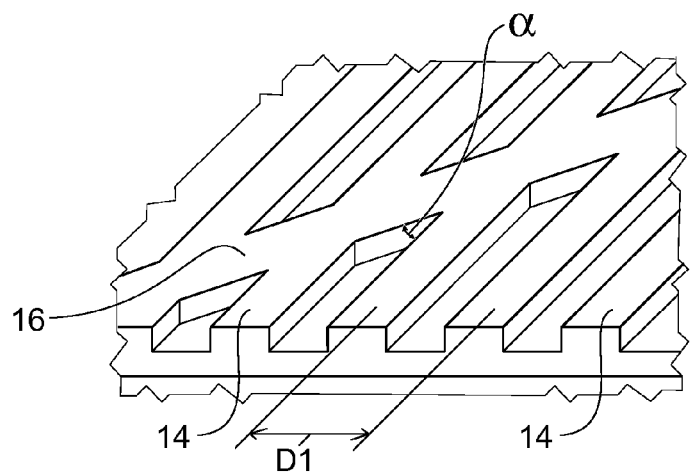
FIG. 4B is a exploded view of a portion of FIG. 4A.

FIGS. 4A and 4B show another example of a fibrous structure 10 according to the present invention. The fibrous structure 10 comprises a surface 12 and two or more first line elements 14 extending in a first direction A and two or more second line elements 16 extending in a second direction B. The fibrous structure 10 further comprises at least one third line element 18. As is evident from FIG. 4A as compared to the fibrous structure 10 of FIG. 3A, the third line element 18 of FIG. 4A intersects one or more second line elements 16 at an angle that is greater than the angle that the third line element 18 intersects one or more second line elements 16 in the fibrous structure 10 shown in FIG. 3A. The first line elements 14 comprises straight and/or substantially straight line elements. The second line elements 16 comprise straight and/or substantially straight line elements. The third line elements 18 comprise straight and/or substantially straight line elements.

Figure 5A:
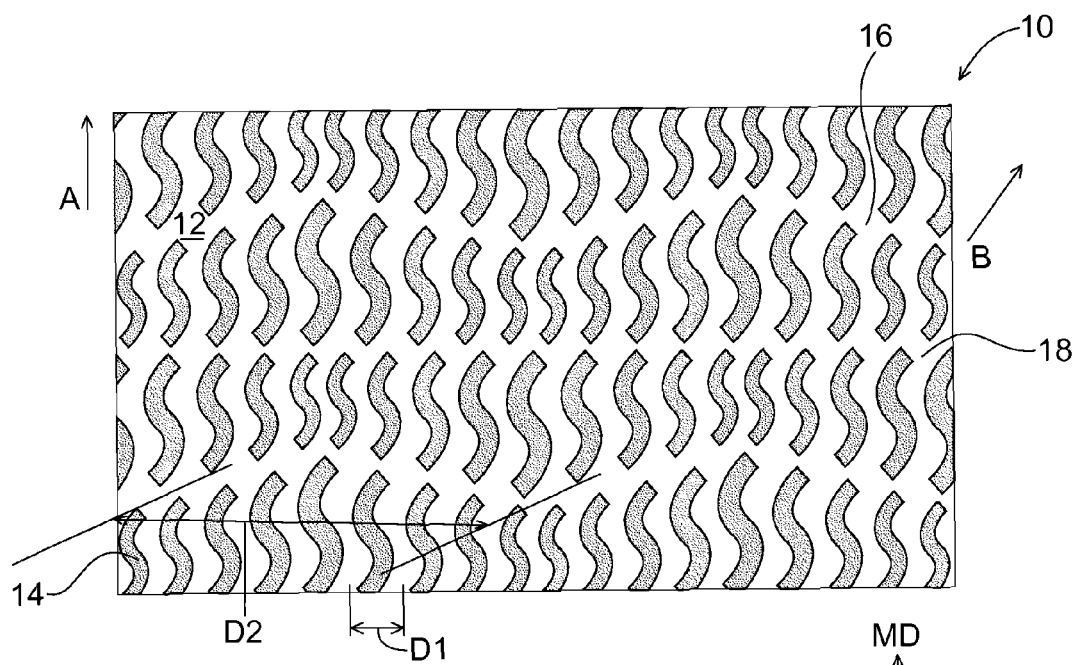
FIG. 5A is a schematic representation of another example of fibrous structure according to the present invention.
Figure 5B:
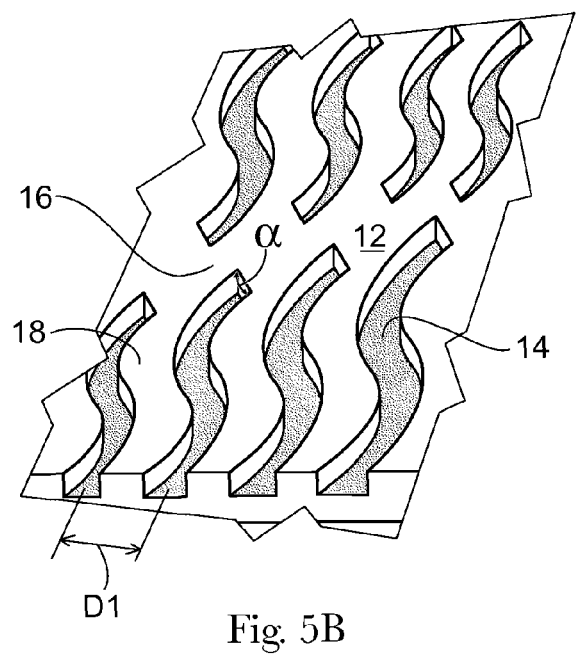
FIG. 5B is a exploded view of a portion of FIG. 5A.

As shown in FIGS. 5A and 5B, the fibrous structure 10 comprises a surface 12 comprising first line elements 14 and second line elements 16 and at least one third line element 18. The first line elements 14 comprise curvilinear elements. The second line elements 16 comprise straight and/or substantially straight line elements. The third line element 18 comprises a straight and/or substantially straight line element.

Figure 6A:
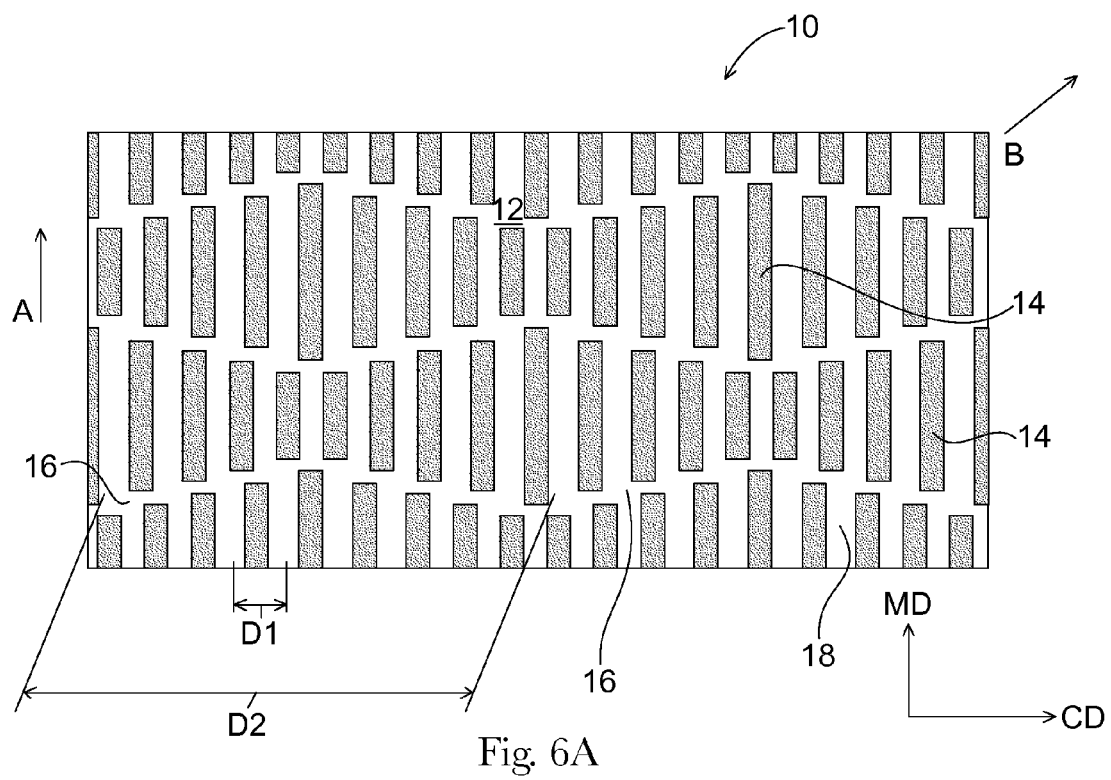
FIG. 6A is a schematic representation of another example of fibrous structure according to the present invention.
Figure 6B:
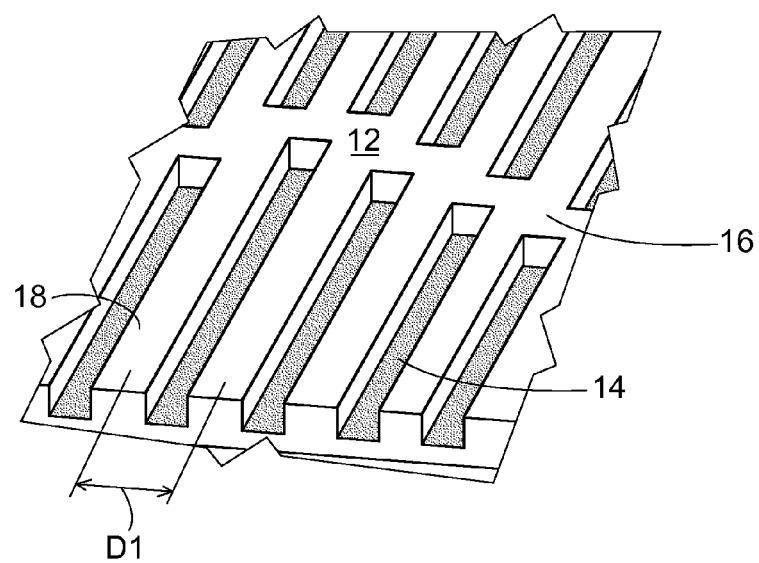
FIG. 6B is a exploded view of a portion of FIG. 6A.

FIGS. 6A and 6B illustrate a fibrous structure 10 comprising a surface 12 comprising first line elements 14 and second line elements 16 and at least one third line element 18. The first line elements 14 comprise straight and/or substantially straight line elements. The second line elements 16 comprise curvilinear line elements. The third line element 18 comprises a curvilinear line element.

Figure 7A:
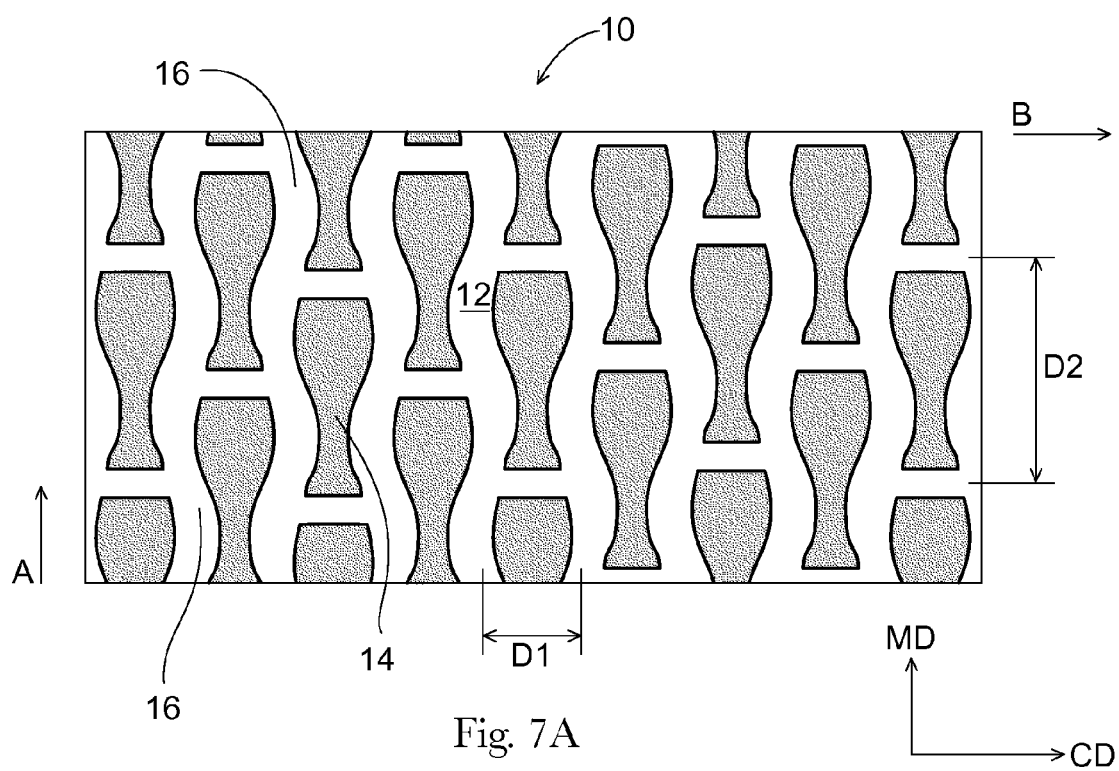
FIG. 7A is a schematic representation of another example of fibrous structure according to the present invention.
Figure 7B:
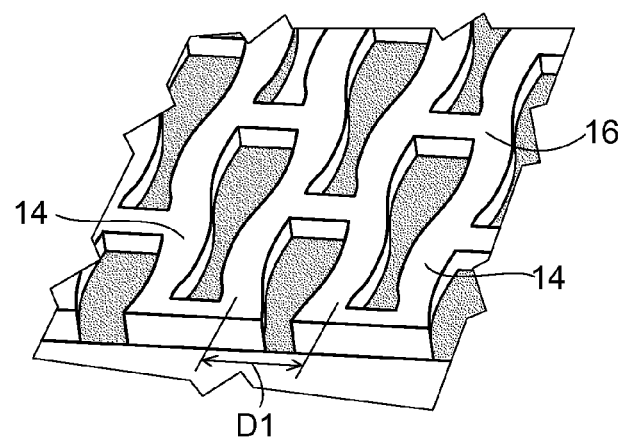
FIG. 7B is a exploded view of a portion of FIG. 7A.

FIGS. 7A and 7B show a fibrous structure 10 comprising a surface 12 comprising first line elements 14 and second line elements 16. The first line elements 14 comprise curvilinear line elements. The second line elements 16 comprise curvilinear line elements.

The fibrous structure of the present invention may comprise fibers and/or filaments. In one example, the fibrous structure comprises pulp fibers, for example, the fibrous structure may comprise greater than 50% and/or greater than 75% and/or greater than 90% and/or to about 100% by weight on a dry fiber basis of pulp fibers. In another example, the fibrous structure may comprise softwood pulp fibers, for example NSK pulp fibers.

The fibrous structure of the present invention may comprise strength agents, for example temporary wet strength agents, such as glyoxylated polyacrylamides, which are commercially available from Ashland Inc. under the tradename Hercobond, and/or permanent wet strength agents, an example of which is commercially available as Kymene® from Ashland Inc., and/or dry strength agents, such as carboxymethylcellulose ("CMC") and/or starch.

The fibrous structure of the present invention may exhibit improved properties compared to known fibrous structures. For example, the fibrous structure of the present invention may exhibit a Total Dry Tensile/(lb of Softwood Fibers)/(lb of Temporary Wet Strength Agent)/(lb of Dry Strength Agent, if any)/(NHPD/ton)% Crepe of greater than 0.33 and/or greater than 0.4 and/or greater than 0.5 and/or greater than 0.7.

In another example, the fibrous structure of the present invention may exhibit a Total Wet Tensile/(lb of Softwood Fibers)/(lb of Temporary Wet Strength Agent)/(lb of Dry Strength Agent, if any)/(Net Horsepower Per Day (NHPD)/ton)% Crepe of greater than 0.063 and/or greater than 0.07 and/or greater than 0.09 and/or greater than 0.12 and/or greater than 0.15.

In still another example, the fibrous structure of the present invention may exhibit a Total Dry Tensile/(lb of Softwood Fibers)/(lb of Permanent Wet Strength Agent)/(lb of Dry Strength Agent, if any)/(NHPD/ton)% Crepe of greater than 0.009 and/or greater than 0.01 and/or greater than 0.015 and/or greater than 0.02 and/or greater than 0.05.

In even another example, the fibrous structure of the present invention may exhibit a Wet Burst/(lb of Softwood Fibers)/(lb of Permanent Wet Strength Agent)/(lb of Dry Strength Agent, if any)/(NHPD/ton)% Crepe of greater than 0.0045 and/or greater than 0.006 and/or greater than 0.008 and/or greater than 0.01 and/or greater than 0.015.

Method for Making Fibrous Structure

Any suitable method known in the art for producing fibrous structures may be utilized so long as the fibrous structure of the present invention is produced therefrom.

In one example, the method comprises the steps of:
a. forming an embryonic fibrous structure (i.e., base web);
b. molding the embryonic fibrous structure using a molding member (i.e., papermaking belt) such that a fibrous structure according to the present invention if formed; and
c. drying the fibrous structure.

The embryonic fibrous structure can be made from various fibers and/or filaments and can be constructed in various ways. For instance, the embryonic fibrous structure can contain pulp fibers and/or staple fibers. Further, the embryonic fibrous structure can be formed and dried in a wet-laid process using a conventional process, conventional wet-press, through-air drying process, fabric-creping process, belt-creping process or the like.

In one example, the embryonic fibrous structure is formed by a wet-laid forming section and transferred to a patterned drying belt (molding member) with the aid of vacuum air. The embryonic fibrous structure takes on a mirrored-molding of the patterned belt to provide a fibrous structure according to the present invention. The transfer and molding of the embryonic fibrous structure may also be by vacuum air, compressed air, pressing, embossing, belt-nipped rush-drag or the like.

Figure 8:
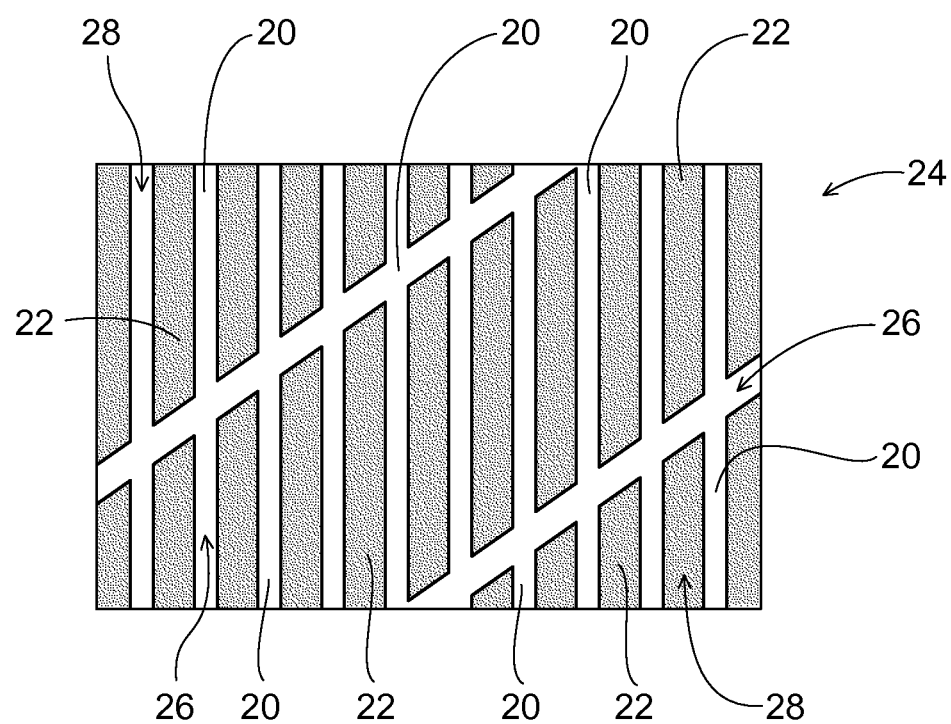
FIG. 8 is a schematic representation of an example of a patterned drying belt in accordance with the present invention.

In one example, the embryonic fibrous structure is molded into a continuous knuckle 20 and discrete cell 22 patterned drying belt (molding member and/or papermaking belt) 24 as shown in FIG. 8. The continuous knuckle 20 is formed from depositing a polymer 26 onto a support member 28, such as a fabric, for example a through-air-drying fabric. The discrete cell 22 is open to the support member, which is foraminous support member that permits air, for example heated air to pass through the embryonic fibrous structure in the discrete cell regions when the embryonic fibrous structure is in contact with the patterned drying belt.

The continuous knuckle 20 and discrete cell 22 patterned drying belt 24 design imparts three regions into the fibrous structure, a first region of high density and first elevation, a second region of low density and second elevation and a third region of a third density and third elevation positioned between the first and second regions. This type of patterned drying belt design yields a fibrous substrate having low density region "domes" having some predetermined geometric shape molded by the discrete cell and each discrete, low density dome is concentrically surrounded by a transition region which is then surrounded by a high density region.

The molded fibrous structure is partially dried to a consistency of about 40% to about 70% with a through air dried process where it is then transferred to the Yankee dryer surface by a pressure roll. The fibrous substrate, supported by the patterned drying belt, travels into the nip formed between the Yankee dyer surface and pressure roll where the first region of high density is pressed and adhered onto the Yankee dryer surface having a coating of creping adhesive. The fibrous structure is dried on the Yankee surface to a moisture level of about 1% to about 5% moisture where it is shear—separated from the Yankee surface with a creping process. The creping blade bevel can be from 15% to about 45% with the final impact angle from about 70 degrees to about 105%.

Of particular interest are the fibrous structures made in accordance to the present invention for which the individualized creping responses of the three regions provide combination of property improvements for strength and flexibility, strength and tensile energy absorption and The fibrous structure resulting from the continuous knuckle, discrete cell design may be subjected to machine-directional compressing, shearing and buckling forces as it impacts the beveled surface of the creping blade. Surprisingly, it has been discovered that when the first region is adhered to the Yankee surface that the high density, first region undergoes a machine-directional compression. The machine-directional compression at the creping blade results in a cross-directional expansion of the first regions. The cross-directional expansion of the first regions causes the juxtaposed low density second regions to buckle and fold in the machine direction. The expansion and buckling of the first and second regions creates stress in the juxtaposed third region of transition. The resulting stress in the juxtaposed third region causes the fiber ends on the surface of the third region to detach or de-bond. The de-bonding of the fiber ends increases the free-fiber ends count and lowers the tangent modulus of the third region. The combination of the juxtaposed second and third region creates a "hinge-effect", resulting in improved cross-directional flexibility of the fibrous structure. Further improvements and control to cross-directional flexibility may be had by increasing or decreasing the frequency of "hinge" regions per inch. As the frequency count of the three regions is increased, the fibrous structure becomes more flexible and its free fiber ends increase. The presence of the continuous knuckle of the first region helps to mitigate and/or avoid the strength loss caused by the increased flexibility Alternatively, the introduction of stress to the third and/or second regions may also be accomplished by means of micro-straining, micro-embossing, ring-rolling, micro-SELFing, patterned web surface brushing and the like.

The fibrous structure may be subjected to any suitable post-processing operation such as embossing, micro-SELFing, ring rolling, printing, lotioning, folding, and the like.

NON-LIMITING EXAMPLES

Example 1—Comparative Example

A known fibrous structure is prepared using a fibrous structure making machine having a layered headbox having a top chamber, a center chamber, and a bottom chamber.

A hardwood stock chest is prepared with eucalyptus fiber having a consistency of about 3.0% by weight. A softwood stock chest is prepared with NSK fiber having a consistency of about 3.0% by weight. The NSK fiber is refined to a Canadian Standard Freeness (CSF) of about 528 ml and is pumped to a blended stock chest with eucalyptus fiber, NSK fiber, bleached broke fiber and machine broke fiber with a final consistency of about 2.5% by weight. A temporary wet strength additive, Hercobond® 1194, made by Hercules Corp of Wilmington, Del. is added to the thick stock of the blended stock chest at about 2.0 lbs. per ton of dry fiber. Additionally, Redibond 5330, a dry strength additive made by National Starch, Indianapolis, Ind., is added to the thick stock line at a rate of 4.1 lbs. per ton of dry fiber.

The eucalyptus fiber slurry is pumped through the top headbox chamber Yankee-side, a blend of eucalyptus fiber, with NSK fiber, bleached broke fiber and machine broke fiber slurry is pumped through the center headbox chamber and a blend of eucalyptus fiber, NSK fiber, bleached broke fiber and machine broke fiber slurry is pumped through the bottom headbox chamber and delivered in superposed relation into the nip of the twin wire-forming nip to form thereon a three-layer embryonic web, of which about 32% of the top side layer thickness is made up of pure eucalyptus fibers, center layer thickness is made up of about 40% of a blend of eucalyptus fiber, NSK fiber, bleached broke fiber and machine broke fiber and the bottom side layer thickness is made up of about 28% of a blend of eucalyptus fiber, NSK fiber, bleached broke fiber and machine broke fiber. Total NSK % inclusion is about 46.7%. Dewatering occurs through the outer wire and the inner wire and is assisted by wire vacuum boxes. The outer wire is an ASTEN-JOHNSON INTEGRA SFT and the inner wire is ASTEN-JOHNSON MONOFLEX 661. The speed of the outer wire and inner wire is about 3429 fpm (feet per minute).

Figure 2:
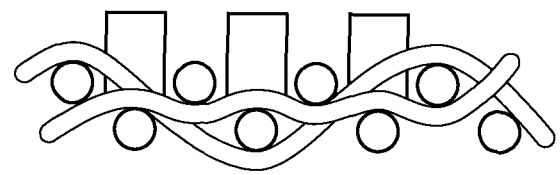
FIG. 2 is a schematic cross-sectional view of a prior art patterned drying belt having polymer columns deposited on a fabric foraminous support member.

The embryonic wet web is transferred from the carrier (inner) wire, at a fiber consistency of about 15% to 18% at the point of transfer, to a patterned drying fabric. The speed of the patterned drying fabric is about 3500 fpm (feet per minute). The drying fabric (Prior Art FIG. 2) is designed to yield a pattern of substantially machine direction oriented linear channels having a continuous network of high density (knuckle) areas. This drying fabric is formed by casting an impervious resin surface onto a fiber mesh supporting fabric. The supporting fabric is a 127×52 filament, dual layer mesh. The thickness of the resin cast is about 11 mils above the supporting fabric.

Further de-watering is accomplished by vacuum assisted drainage until the web has a fiber consistency of about 20% to 30%.

While remaining in contact with the patterned drying fabric, the web is pre-dried by air blow-through pre-dryers to a fiber consistency of about 60% by weight.

After the pre-dryers, the semi-dry web is transferred to the Yankee dryer and adhered to the surface of the Yankee dryer with a sprayed a creping adhesive coating. The coating is a blend consisting of Georgia Pacific's Unicrepe 457T20 and Vinylon Works' Vinylon 8844 at a ratio of about 92 to 8, respectively. The fiber consistency is increased to about 97% before the web is dry-creped from the Yankee with a doctor blade.

The doctor blade has a bevel angle of about 25 degrees and is positioned with respect to the Yankee dryer to provide an impact angle of about 81 degrees. The Yankee dryer is operated at a temperature of about 350° F. (177° C.) and a speed of about 3500 fpm. The fibrous structure is wound in a roll using a surface driven reel drum having a surface speed of about 3040 feet per minute. The fibrous structure may be subjected to post treatments such as embossing and/or tuft generating or application of a chemical surface softening. The fibrous structure may be subsequently converted into a two-ply sanitary tissue product having a basis weight of about 11.8 lbs/3000 ft$^2$. For each ply, the outer layer having the eucalyptus fiber furnish is oriented toward the outside in order to form the consumer facing surfaces of the two-ply sanitary tissue product.

The sanitary tissue product is soft, flexible and absorbent.

Example 2

Example 2 is the same as in example 1, but with a patterned drying belt (molding member) according to the present invention, for example a patterned drying belt as shown in FIG. 8, refining to CSF of 555 ml, temporary wet strength agent (Hercobond 1194) at about 1.5 lbs. per ton of dry fiber, dry strength agent (Redibond 5330) at about 2.2 lbs. per ton of dry fiber and % crepe is set to about 14.8%.

Example 3

Example 3 is the same as in example 1, but with a patterned drying belt (molding member) according to the present invention, for example a patterned drying belt as shown in FIG. 8, refining to CSF of 508 ml, temporary wet strength (Hercobond 1194) at about 1.1 lbs. per ton of dry fiber, no dry strength agent (Redibond is turned "off") and % crepe is set to about 13.2%.

Example 4—Comparative Example

A known fibrous structure is prepared using a fibrous structure making machine having a layered headbox having a top and bottom chamber.

A hardwood stock chest is prepared with eucalyptus fiber having a consistency of about 3.0% by weight. A softwood stock chest is prepared with NSK (northern softwood Kraft) and SSK (southern softwood Kraft) fibers having a consistency of about 3.0% by weight. The NSK and SSK fibers are refined to a Canadian Standard Freeness of about 565 ml and are pumped to a blended stock chest with bleached broke fiber and machine broke fiber with a final consistency of about 2.5% by weight. A 2% solution of Kymene 1142, wet strength additive, is added to the NSK/SSK stock pipe prior to refining at about 18.0 lbs. per ton of dry fiber. Kymene 1142 is supplied by Hercules Corp of Wilmington, Del. The NSK/SSK slurry is mixed in a blended chest with machine broke and converting broke. A 1% solution of carboxy methyl cellulose (CMC) is added to the NSK/SSK blended slurry at a rate of about 6.4 lbs. per ton of dry fiber to enhance the dry strength of the fibrous structure. CMC is supplied by CP Kelco. The aqueous slurry of NSK fibers passes through a centrifugal stock pump to aid in distributing the CMC.

The NSK blended slurry is diluted with white water at the inlet of a fan pump to a consistency of about 0.15% based on the total weight of the NSK fiber slurry. The eucalyptus fibers, likewise, are diluted with white water at the inlet of a fan pump to a consistency of about 0.15% based on the total weight of the eucalyptus fiber slurry. The eucalyptus slurry and the NSK slurry are directed to a multi-channeled headbox suitably equipped with layering leaves to maintain the streams as separate layers until discharged onto a traveling Fourdrinier wire. A two layered headbox is used. The eucalyptus slurry containing 45% of the dry weight of the tissue ply is directed to the chamber leading to the layer in contact with the wire, while the NSK slurry comprising 55% of the dry weight of the ultimate tissue ply is directed to the chamber leading to the outside layer. The NSK and eucalyptus slurries are combined at the discharge of the headbox into a composite slurry.

The composite slurry is discharged onto the traveling Fourdrinier wire and is dewatered assisted by a deflector and vacuum boxes. The Fourdrinier wire is an AJ123a (866a) having 205 machine-direction and 150 cross-machine-direction monofilaments per inch. The speed of the Fourdrinier wire is about 3150 fpm (feet per minute).

The embryonic wet web is dewatered to a consistency of about 15% just prior to transfer to a patterned drying fabric made in accordance with U.S. Pat. No. 4,529,480. The speed of the patterned drying fabric is about 1.3% faster than the speed of the Fourdrinier wire. The drying fabric is designed to yield a pattern of substantially machine direction oriented linear channels having a continuous network of high density (knuckle) areas. This drying fabric is formed by casting an impervious resin surface onto a fiber mesh supporting fabric. The supporting fabric is a 127×52 filament, dual layer mesh. The thickness of the resin cast is about 9 mils above the supporting fabric. The area of the continuous network is about 40 percent of the surface area of the drying fabric.

Further de-watering is accomplished by vacuum assisted drainage until the web has a fiber consistency of about 25%. While remaining in contact with the patterned drying fabric, the web is pre-dried by air blow-through pre-dryers to a fiber consistency of about 65% by weight.

After the pre-dryers, the semi-dry web is transferred to the Yankee dryer and adhered to the surface of the Yankee dryer with a sprayed creping adhesive coating. The coating is a blend consisting of National Starch and Chemical's Redibond 5330 and Vinylon Works' Vinylon 99-60. The fiber consistency is increased to about 97% before the web is dry creped from the Yankee with a doctor blade.

The doctor blade has a bevel angle of about 23 degrees and is positioned with respect to the Yankee dryer to provide an impact angle of about 85 degrees. The Yankee dryer is operated at a temperature of about 280° F. (177° C.) and a speed of about 3200 fpm. The fibrous structure is wound in a roll using a surface driven reel drum having a surface speed of about 2621 feet per minute.

Two plies are combined with the wire side facing out. During the converting process, a surface softening agent may be applied with a slot extrusion die to the outside surface of both plies. The surface softening agent is a 19% solution of silicone (i.e. MR-1003, marketed by Wacker Chemical Corporation of Adrian, MI). The solution is applied to the web at a rate of about 1250 ppm. The plies are then bonded together with mechanical plybonding wheels, slit, and then folded into finished 2-ply facial tissue product. Each ply and the combined plies are tested in accordance with the test methods described below.

Example 5

Example 5 is the same as in example 4, but with a patterned drying belt (molding member) according to the present invention, for example a patterned drying belt as shown in FIG. 8, refining to CSF of 576 ml, CMC addition set to 4.5 lbs per ton of dry fiber and % crepe is set to about 17%.

Example 6—Comparative Example

A known fibrous structure is prepared using a fibrous structure making machine having a layered headbox having a top and bottom chamber.

A hardwood stock chest is prepared with eucalyptus fiber having a consistency of about 3.0% by weight. A softwood stock chest is prepared with NSK (northern softwood Kraft) and SSK (southern softwood Kraft) fibers having a consistency of about 3.0% by weight. The NSK and SSK fibers are refined to a Canadian Standard Freeness of about 565 ml and are pumped to a blended stock chest with bleached broke fiber and machine broke fiber with a final consistency of about 2.5% by weight. A 2% solution of Kymene 1142, wet strength additive, is added to the NSK/SSK stock pipe prior to refining at about 19.0 lbs. per ton of dry fiber. Kymene 1142 is supplied by Hercules Corp of Wilmington, Del. The NSK/SSK slurry is mixed in a blended chest with machine broke and converting broke. A 1% solution of carboxy methyl cellulose (CMC) is added to the NSK/SSK blended slurry at a rate of about 4.5 lbs. per ton of dry fiber to enhance the dry strength of the fibrous structure. CMC is supplied by CP Kelco. The aqueous slurry of NSK fibers passes through a centrifugal stock pump to aid in distributing the CMC.

The NSK blended slurry is diluted with white water at the inlet of a fan pump to a consistency of about 0.15% based on the total weight of the NSK fiber slurry. The eucalyptus fibers, likewise, are diluted with white water at the inlet of a fan pump to a consistency of about 0.15% based on the total weight of the eucalyptus fiber slurry. The eucalyptus slurry and the NSK slurry are directed to a multi-channeled headbox suitably equipped with layering leaves to maintain the streams as separate layers until discharged onto a traveling Fourdrinier wire. A two layered headbox is used. The eucalyptus slurry containing 54% of the dry weight of the tissue ply is directed to the chamber leading to the layer in contact with the wire, while the NSK slurry comprising 46% of the dry weight of the ultimate tissue ply is directed to the chamber leading to the outside layer. The NSK and eucalyptus slurries are combined at the discharge of the headbox into a composite slurry.

The composite slurry is discharged onto the traveling Fourdrinier wire and is dewatered assisted by a deflector and vacuum boxes. The Fourdrinier wire is an AJ123a (866a) having 205 machine-direction and 150 cross-machine-direction monofilaments per inch. The speed of the Fourdrinier wire is about 2750 fpm (feet per minute).

The embryonic wet web is dewatered to a consistency of about 15% just prior to transfer to a patterned drying fabric made in accordance with U.S. Pat. No. 4,529,480. The speed of the patterned drying fabric is about 1.3% faster than the speed of the Fourdrinier wire. The drying fabric is designed to yield a pattern of substantially machine direction oriented linear channels having a continuous network of high density (knuckle) areas. This drying fabric is formed by casting an impervious resin surface onto a fiber mesh supporting fabric. The supporting fabric is a 127×52 filament, dual layer mesh. The thickness of the resin cast is about 9 mils above the supporting fabric. The area of the continuous network is about 40 percent of the surface area of the drying fabric.

Further de-watering is accomplished by vacuum assisted drainage until the web has a fiber consistency of about 25%. While remaining in contact with the patterned drying fabric, the web is pre-dried by air blow-through pre-dryers to a fiber consistency of about 65% by weight.

After the pre-dryers, the semi-dry web is transferred to the Yankee dryer and adhered to the surface of the Yankee dryer with a sprayed a creping adhesive coating. The coating is a blend consisting of National Starch and Chemical's Redibond 5330 and Vinylon Works' Vinylon 99-60. The fiber consistency is increased to about 97% before the web is dry creped from the Yankee with a doctor blade.

The doctor blade has a bevel angle of about 23 degrees and is positioned with respect to the Yankee dryer to provide an impact angle of about 85 degrees. The Yankee dryer is operated at a temperature of about 280° F. and a speed of about 2800 fpm. The fibrous structure is wound in a roll using a surface driven reel drum having a surface speed of about 2379 feet per minute.

Two plies are combined with the wire side facing out. During the converting process, a surface softening agent is applied with a slot extrusion die to the outside surface of both plies. The surface softening agent is a formula containing one or more polyhydroxy compounds (Polyethylene glycol, Polypropylene glycol, and/or copolymers of the like marketed by BASF Corporation of Florham Park, N.J.), glycerin (marketed by PG Chemical Company), and silicone. The solution is applied to the web at a rate of about 5.45% by weight. The plies are then bonded together with mechanical plybonding wheels, slit, and then folded into finished 2-ply facial tissue product. Each ply and the combined plies are tested in accordance with the test methods described below.

Example 7

Example 7 is the same as in example 6, but with a patterned drying belt (molding member) according to the present invention, for example a patterned drying belt as shown in FIG. 8, refining to CSF of about 576 ml, CMC addition set to 3.2 lbs per ton of dry fiber and % crepe is set to about 12.5%.

Test Methods

Unless otherwise specified, all tests described herein including those described under the Definitions section and the following test methods are conducted on samples that have been conditioned in a conditioned room at a temperature of 23° C.±2.2° C. and a relative humidity of 50%±10% for 2 hours prior to the test. All plastic and paper board packaging materials must be carefully removed from the paper samples prior to testing. Discard any damaged product. All tests are conducted in such conditioned room.

Basis Weight Test Method

Basis weight of a fibrous structure sample is measured by selecting twelve (12) usable units (also referred to as sheets) of the fibrous structure and making two stacks of six (6) usable units each. Perforation must be aligned on the same side when stacking the usable units. A precision cutter is used to cut each stack into exactly 8.89 cm×8.89 cm (3.5 in.×3.5 in.) squares. The two stacks of cut squares are combined to make a basis weight pad of twelve (12) squares thick. The basis weight pad is then weighed on a top loading balance with a minimum resolution of 0.01 g. The top loading balance must be protected from air drafts and other disturbances using a draft shield. Weights are recorded when the readings on the top loading balance become constant. The Basis Weight is calculated as follows:

$$\text{Basis Weight (lbs/3000 ft}^2\text{)} = \frac{\text{Weight of basis weight pad (g)} \times 3000 \text{ ft}^2}{453.6 \text{ g/lbs} \times 12 \text{ (usable units)} \times [12.25 \text{ in}^2 (\text{Area of basis weight pad})/144 \text{ in}^2]}$$

$$\text{Basis Weight (g/m}^2\text{)} = \frac{\text{Weight of basis weight pad (g)} \times 10{,}000 \text{ cm}^2/\text{m}^2}{79.0321 \text{ cm}^2 (\text{Area of basis weight pad}) \times 12 \text{ (usable units)}}$$

Caliper Test Method

Caliper of a fibrous structure is measured by cutting five (5) samples of fibrous structure such that each cut sample is larger in size than a load foot loading surface of a VIR Electronic Thickness Tester Model II available from Thwing-Albert Instrument Company, Philadelphia, Pa. Typically, the load foot loading surface has a circular surface area of about 3.14 in². The sample is confined between a horizontal flat surface and the load foot loading surface. The load foot loading surface applies a confining pressure to the sample of 15.5 g/cm². The caliper of each sample is the resulting gap between the flat surface and the load foot loading surface. The caliper is calculated as the average caliper of the five samples. The result is reported in millimeters (mm).

Elongation, Tensile Strength, TEA and Modulus Test Methods

Remove five (5) strips of four (4) usable units (also referred to as sheets) of fibrous structures and stack one on top of the other to form a long stack with the perforations between the sheets coincident. Identify sheets 1 and 3 for machine direction tensile measurements and sheets 2 and 4 for cross direction tensile measurements. Next, cut through the perforation line using a paper cutter (JDC-1-10 or JDC-1-12 with safety shield from Thwing-Albert Instrument Co. of Philadelphia, Pa.) to make 4 separate stacks. Make sure stacks 1 and 3 are still identified for machine direction testing and stacks 2 and 4 are identified for cross direction testing.

Cut two 1 inch (2.54 cm) wide strips in the machine direction from stacks 1 and 3. Cut two 1 inch (2.54 cm) wide strips in the cross direction from stacks 2 and 4. There are now four 1 inch (2.54 cm) wide strips for machine direction tensile testing and four 1 inch (2.54 cm) wide strips for cross direction tensile testing. For these finished product samples, all eight 1 inch (2.54 cm) wide strips are five usable units (sheets) thick.

For the actual measurement of the elongation, tensile strength, TEA and modulus, use a Thwing-Albert Intelect II Standard Tensile Tester (Thwing-Albert Instrument Co. of Philadelphia, Pa.). Insert the flat face clamps into the unit and calibrate the tester according to the instructions given in the operation manual of the Thwing-Albert Intelect II. Set the instrument crosshead speed to 4.00 in/min (10.16 cm/min) and the 1st and 2nd gauge lengths to 2.00 inches (5.08 cm). The break sensitivity is set to 20.0 grams and the sample width is set to 1.00 inch (2.54 cm) and the sample thickness is set to 0.3937 inch (1 cm). The energy units are set to TEA and the tangent modulus (Modulus) trap setting is set to 38.1 g.

Take one of the fibrous structure sample strips and place one end of it in one clamp of the tensile tester. Place the other end of the fibrous structure sample strip in the other clamp. Make sure the long dimension of the fibrous structure sample strip is running parallel to the sides of the tensile tester. Also make sure the fibrous structure sample strips are not overhanging to the either side of the two clamps. In addition, the pressure of each of the clamps must be in full contact with the fibrous structure sample strip.

After inserting the fibrous structure sample strip into the two clamps, the instrument tension can be monitored. If it shows a value of 5 grams or more, the fibrous structure sample strip is too taut. Conversely, if a period of 2-3 seconds passes after starting the test before any value is recorded, the fibrous structure sample strip is too slack.

Start the tensile tester as described in the tensile tester instrument manual. The test is complete after the crosshead automatically returns to its initial starting position. When the test is complete, read and record the following with units of measure:

Peak Load Tensile (Tensile Strength) (g/in)
Peak Elongation (Elongation) (%)
Peak TEA (TEA) (in-g/in$^2$)
Tangent Modulus (Modulus) (at 15 g/cm)

Test each of the samples in the same manner, recording the above measured values from each test.
Calculations:

Geometric Mean (GM) Elongation=Square Root of [MD Elongation (%)×CD Elongation (%)]

Total Dry Tensile (TDT)=Peak Load MD Tensile (g/in)+Peak Load CD Tensile (g/in)

Tensile Ratio=Peak Load MD Tensile (g/in)/Peak Load CD Tensile (g/in)

Geometric Mean (GM) Tensile=[Square Root of (Peak Load MD Tensile (g/in)×Peak Load CD Tensile (g/in))]×3

TEA=MD TEA (in-g/in$^2$)+CD TEA (in-g/in$^2$)

Geometric Mean (GM) TEA=Square Root of [MD TEA (in-g/in$^2$)×CD IBA (in-g/in$^2$)]

Modulus=MD Modulus (at 15 g/cm)+CD Modulus (at 15 g/cm)

Geometric Mean (GM) Modulus=Square Root of [MD Modulus (at 15 g/cm)×CD Modulus (at 15 g/cm)]

Dimensions of Linear Element/Linear Element Forming Component Test Method

The length of a linear element in a fibrous structure and/or the length of a linear element forming component in a molding member is measured by image scaling of a light microscopy image of a sample of fibrous structure.

A light microscopy image of a sample to be analyzed such as a fibrous structure or a molding member is obtained with a representative scale associated with the image. The images is saved as a *.tiff file on a computer. Once the image is saved, SmartSketch, version 05.00.35.14 software made by Intergraph Corporation of Huntsville, Ala., is opened. Once the software is opened and running on the computer, the user clicks on "New" from the "File" drop-down panel. Next, "Normal" is selected. "Properties" is then selected from the "File" drop-down panel. Under the "Units" tab, "mm" (millimeters) is chosen as the unit of measure and "0.123" as the precision of the measurement. Next, "Dimension" is selected from the "Format" drop-down panel. Click the "Units" tab and ensure that the "Units" and "Unit Labels" read "mm" and that the "Round-Off" is set at "0.123." Next, the "rectangle" shape from the selection panel is selected and dragged into the sheet area. Highlight the top horizontal line of the rectangle and set the length to the corresponding scale indicated light microscopy image. This will set the width of the rectangle to the scale required for sizing the light microscopy image. Now that the rectangle has been sized for the light microscopy image, highlight the top horizontal line and delete the line. Highlight the left and right vertical lines and the bottom horizontal line and select "Group". This keeps each of the line segments grouped at the width dimension ("mm") selected earlier. With the group highlighted, drop the "line width" panel down and type in "0.01 mm." The scaled line segment group is now ready to use for scaling the light microscopy image can be confirmed by right-clicking on the "dimension between", then clicking on the two vertical line segments.

To insert the light microscopy image, click on the "Image" from the "insert" drop-down panel. The image type is preferably a *.tiff format. Select the light microscopy image to be inserted from the saved file, then click on the sheet to place the light microscopy image. Click on the right bottom corner of the image and drag the corner diagonally from bottom-right to top-left. This will ensure that the image's aspect ratio will not be modified. Using the "Zoom In" feature, click on the image until the light microscopy image scale and the scale group line segments can be seen. Move the scale group segment over the light microscopy image scale. Increase or decrease the light microscopy image size as needed until the light microscopy image scale and the scale group line segments are equal. Once the light microscopy image scale and the scale group line segments are visible, the object(s) depicted in the light microscopy image can be measured using "line symbols" (located in the selection panel on the right) positioned in a parallel fashion and the "Distance Between" feature. For length and width measurements, a top view of a fibrous structure and/or molding member is used as the light microscopy image. For a height measurement, a side or cross sectional view of the fibrous structure and/or molding member is used as the light microscopy image.

Wet Burst Strength Test Method

"Wet Burst Strength" as used herein is a measure of the ability of a fibrous structure and/or a fibrous structure product incorporating a fibrous structure to absorb energy, when wet and subjected to deformation normal to the plane of the fibrous structure and/or fibrous structure product.

Wet burst strength may be measured using a Thwing-Albert Burst Tester Cat. No. 177 equipped with a 2000 g load cell commercially available from Thwing-Albert Instrument Company, Philadelphia, Pa.

Wet burst strength is measured by taking two (2) multi-ply fibrous structure product samples. Using scissors, cut the samples in half in the MD so that they are approximately 228 mm in the machine direction and approximately 114 mm in the cross machine direction, each two (2) plies thick (you now have 4 samples). First, condition the samples for two (2) hours at a temperature of 73° F.±2° F. (about 23° C.±1° C.) and a relative humidity of 50%±2%. Next age the samples by stacking the samples together with a small paper clip and "fan" the other end of the stack of samples by a clamp in a 105° C. (±1° C.) forced draft oven for 5 minutes (±10 seconds). After the heating period, remove the sample stack from the oven and cool for a minimum of three (3) minutes before testing. Take one sample strip, holding the sample by the narrow cross machine direction edges, dipping the center of the sample into a pan filled with about 25 mm of distilled water. Leave the sample in the water four (4) (±0.5) seconds. Remove and drain for three (3) (±0.5) seconds holding the sample so the water runs off in the cross machine direction. Proceed with the test immediately after the drain step. Place the wet sample on the lower ring of a sample holding device of the Burst Tester with the outer surface of the sample facing up so that the wet part of the sample completely covers the open surface of the sample holding ring. If wrinkles are present, discard the samples and repeat with a new sample. After the sample is properly in place on the lower sample holding ring, turn the switch that lowers the upper ring on the Burst Tester. The sample to be tested is now securely gripped in the sample holding unit. Start the burst test immediately at this point by pressing the start button on the Burst Tester. A plunger will begin to rise toward the wet surface of the sample. At the point when the sample tears or ruptures, report the maximum reading. The plunger will automatically reverse and return to its original starting position. Repeat this procedure on three (3) more samples for a total of four (4) tests, i.e., four (4) replicates. Report the results as an average of the four (4) replicates, to the nearest g.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A toilet tissue comprising a molded fibrous structure comprising pulp fibers and a temporary wet strength agent, and having a molded surface comprising at least two first line elements extending in a first direction and at least two second line elements extending in a second direction different from the first direction, wherein at least one of the first line elements is connected to and is coplanar with at least one of the second line elements at an angle of from about 10° to about 85°, wherein the ratio of the average distance between the two second line elements and the average distance between the two first line elements is greater than 1 and wherein at least one of the first line elements and second line elements is a molded line element, wherein the toilet tissue exhibits a basis weight of greater than 15 g/m$^2$ to about 120 g/m$^2$.

2. The toilet tissue according to claim 1 wherein the surface comprises a plurality of first line elements.

3. The toilet tissue according to claim 2 wherein the first line elements are substantially parallel to one another.

4. The toilet tissue according to claim 1 wherein the surface comprises a plurality of second line elements.

5. The toilet tissue according to claim 4 wherein the second line elements are substantially parallel to one another.

6. The toilet tissue according to claim 1 wherein the surface comprises a plurality of first line elements and a plurality of second line elements.

7. The toilet tissue according to claim 6 wherein the ratio of the maximum average distance between adjacent second line elements and the maximum average distance between adjacent first line elements is greater than 1.

8. The toilet tissue according to claim 1 wherein at least one of the first line elements comprises a curvilinear line element.

9. The toilet tissue according to claim 1 wherein at least one of the second line elements comprises a curvilinear line element.

10. The toilet tissue according to claim 1 wherein the second line element is connected to the first line element at an angle of from about 10° to about 70°.

11. The toilet tissue according to claim 1 wherein the surface further comprises a third line element that intersects at least one second line element.

12. The toilet tissue according to claim 11 wherein the third line element intersects the second line element at an angle of from about 10° to about 90°.

13. The toilet tissue according to claim 12 wherein the third line element intersects that second line element at an angle of from about 40° to about 90°.

14. The toilet tissue according to claim 11 wherein the third line element connects to at least one of the first line elements.

15. The toilet tissue according to claim 14 wherein the third line element connects to the first line element at an angle of from about 5° to about 90°.

16. The toilet tissue according to claim 15 wherein the third line element connects to the first line element at an angle of from about 10° to about 85°.

17. The toilet tissue according to claim 11 wherein at least one of the second line elements intersects the third line element.

18. The toilet tissue according to claim 17 wherein the second line element intersects the third line element at an angle of from about 10° to about 90°.

19. The toilet tissue according to claim 18 wherein the second line element intersects the third line element at an angle of from about 10° to about 45°.

20. The toilet tissue according to claim 1 wherein the pulp fibers comprise softwood pulp fibers.

* * * * *